United States Patent [19]

Willoughby

[11] Patent Number: 5,008,745

[45] Date of Patent: Apr. 16, 1991

[54] CLOCK SYNCHRONIZED DIGITAL TV MOTION DETECTOR

[75] Inventor: Jon S. Willoughby, Oxford, Pa.

[73] Assignee: Burle Technologies, Inc., Wilmington, Del.

[21] Appl. No.: 454,179

[22] Filed: Dec. 21, 1989

[51] Int. Cl.[5] .................... H04N 7/18

[52] U.S. Cl. .................... 358/105; 358/108; 358/96

[58] Field of Search .................... 358/105, 108, 96, 136, 358/166, 167

[56] References Cited

U.S. PATENT DOCUMENTS

| | | | |
|---|---|---|---|
| 3,969,577 | 7/1976 | Lloyd | 358/136 |
| 4,160,998 | 7/1979 | Kamin | 358/105 |
| 4,597,010 | 6/1986 | Carr | 358/136 |
| 4,703,358 | 10/1987 | Flannaghan | 358/105 |
| 4,731,648 | 3/1988 | Bernard | 358/105 |
| 4,766,490 | 8/1988 | Haghiri | 358/105 |
| 4,772,945 | 9/1988 | Tagawa | 358/105 |
| 4,783,833 | 11/1988 | Kawabata | 358/105 |
| 4,805,018 | 2/1989 | Nishimura | 355/105 |
| 4,894,716 | 1/1990 | Aschwanden | 358/108 |

*Primary Examiner*—Tommy P. Chin
*Assistant Examiner*—Tuan V. Ho
*Attorney, Agent, or Firm*—Martin Fruitman

[57] ABSTRACT

A digital motion verification circuit for a television system. The circuit synchronizes an actual and a stored signal from an edge motion indicator with the system clock, so that the edge signals are precisely timed and do not have errors from overlapping or mistimed signals. The circuit uses an EXCLUSIVE OR circuit followed by an inverter stage to produce an output when the clock synchronized stored signal and the actual signal have a discrepancy. This EXCLUSIVE OR output signal is applied to the data input of a shift register that produces clock synchronized output signals which, when accumulated to a predetermined number, initiate a motion flag which indicates the presence of several exactly adjacent signals.

4 Claims, 1 Drawing Sheet

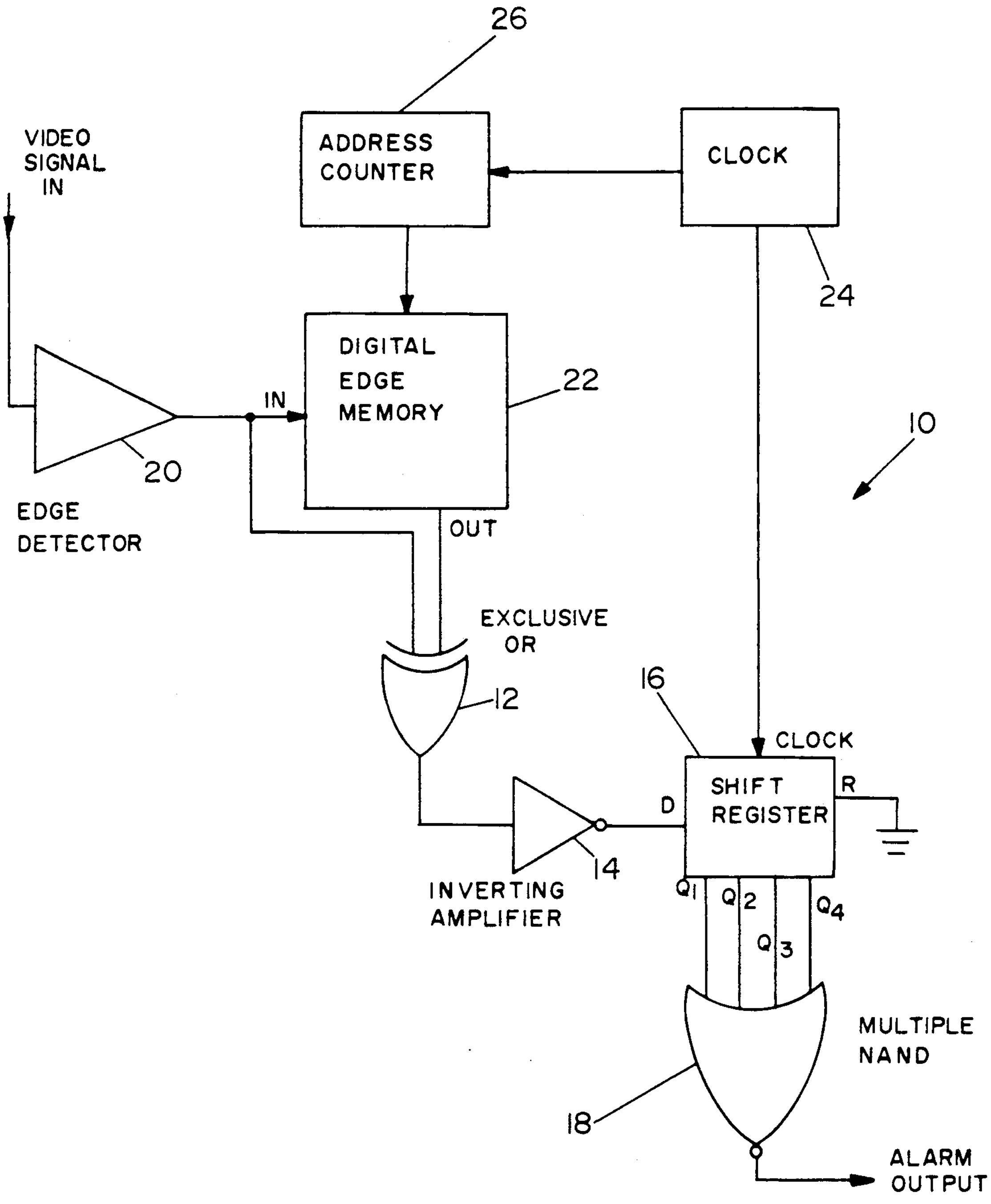
26
ADDRESS COUNTER
CLOCK
VIDEO SIGNAL IN
24
DIGITAL EDGE MEMORY
22
IN
10
20
EDGE DETECTOR
OUT
EXCLUSIVE OR
12
16
CLOCK
SHIFT REGISTER
R
D
14
INVERTING AMPLIFIER
Q1
Q2
Q3
Q4
MULTIPLE NAND
18
ALARM OUTPUT

CLOCK SYNCHRONIZED DIGITAL TV MOTION DETECTOR

SUMMARY OF THE INVENTION

This invention deals generally with pictorial transmission by television and more specifically with the apparatus of a TV signal motion detector.

Closed circuit television systems are becoming common enough so that almost everyone has seen one or been seen on one. Perhaps the most widely used application for such systems is security monitoring. Almost all department stores and warehouses now have such installations, and while the use of such equipment during periods of high traffic may require almost constant viewing of monitor screens, these systems can also be used to great advantage during periods when there is no activity expected. Under such circumstances it is not only inefficient to have a person always watching the screen, but it is an almost impossible task to constantly watch the screen when there is no activity upon it.

Therefore, motion detection systems have been developed so that the TV signal supplied to the screen is monitored electronically, and an alarm is activated whenever any motion is detected. This permits dramatic changes in the traditional job of night watchman. Instead of walking from one station to another in a building, the watchman now stays in one location which contains one or more closed circuit TV monitors upon which he can view every area in the building. This permits one person to secure an area which is much larger than was previously possible. Moreover, the motion detectors assure that the watchman need not actually be watching a particular screen at exactly the same moment that some activity occurs, because the electronically initiated alarm will quickly direct the viewer to the screen upon which the activity can be seen.

Unfortunately, one of the common problems with TV motion detectors is that they are too sensitive, and that they fail to discriminate between incidental motion or randomly generated electronic noise and true motion of an object within the TV camera's field of view. Unless a motion detector circuit can be made fully reliable it is virtually useless, and reliability involves not only not being triggered by random electronic signals, but also not being activated by motion which is so small, for instance building vibrations or moving curtains, that it has no significance.

It should be appreciated that even a single horizontal line of a TV screen consists of an enormous number of small elements of information, and it is these elements of information which must be processed to detect motion in the viewing field. Therefore, one method of increasing reliability has been to reduce the amount of data processed by the motion detector circuit, thereby decreasing the likelihood of generating nois which causes false indications of motion. Since in the ideal system all that is necessary to indicate motion is a difference in one picture element from one scene to another, it is almost certain that such a difference will occur in at least some picture elements in successive scenes merely because of the generation of electronic noise.

The present invention is one of the type which counteracts the problem of too much data by processing only the signals from the edges of objects. That is, the circuit stores the location of all the distinct changes of light intensity, the edges of objects, using digital circuit techniques to indicate the presence or absence of each edge. Then the same observation is made for a subsequent scene, and the comparison is made to find whether the previous edges are still in the same location. Such a system reduces the data processed because it only uses two picture elements on each horizontal line for each object, regardless of how many picture elements the object covers.

Another solution to the problem of reliable motion detection is to accumulate more than a single indication of motion before activating an alarm. It is this circuit that eliminates the undesirable alarms from small movements of fixed objects. Thus, when a circuit requires that, for instance, four edge motion indicators occur adjacent to each other before a motion alarm is activated, then the vibration of a cabinet due to nearby traffic is not likely to cause an alarm.

The present invention provides an improved edge motion detector and motion indicator accumulation circuit by using only digital processing. Prior circuits used analog circuits such as one-shot multivibrators, and were therefore subject to the variations inherent in the timing of such circuits. The present invention instead uses digital circuitry, all of which is synchronized to a single clock, and therefore accomplishes the comparison between the edge signals from two scenes with a precision and noise immunity not previously available.

In the present invention a conventional edge detector circuit sends its signal to a digital memory in which the edge signal is stored for a selected number of frames for comparison to a signal generated by the edge detector at a later time. The newer edge signal and the stored edge signal, which is sent out of the memory at a precise time determined by the system clock, are both fed to the inputs of an EXCLUSIVE OR circuit which produces an output only when the two inputs do not occur at the same time. Thus, if there is no movement of the particular edge being compared, the EXCLUSIVE OR circuit gives no output. However, if one edge is not present and the other is, then movement has occurred, and the EXCLUSIVE OR circuit does generate a motion indicator output signal.

In order to assure that such a signal is not an isolated case caused by electronic noise in the video circuit or the result of minor vibrations of an object in the viewing field, the output of the EXCLUSIVE OR is fed to a shift register which accumulates a preset number of adjacent motion indicator signals before producing an alarm signal. Since the shift register is also driven by the system clock, it is synchronized with the output of the EXCLUSIVE OR, and therefore it also does not respond to unsynchronized noise signals which might occur.

The actual alarm signal is produced by a multiple input circuit which, once it has received the requisite number of signals from the shift register at its multiple inputs, produces the final alarm signal, which is also precisely timed to the system clock.

Since the described invention merely determines whether a previous edge still exists, or if a previously absent edge has appeared, it has no preference for vertical or horizontal motion and operates equally well in both cases. The invention therefore insures that even pure vertical motion will trigger an alarm, but it also suppresses false alarms from motion which actually occurs, if the motion is too small to be of consequence. Moreover, it does not rely upon resistor-capacitor time constants which are subject to inaccuracies, and, because of its precise timing, it does not require the safety factor of the edges overlapping in order to produce a motion indicator signal.

BRIEF DESCRIPTION OF THE DRAWINGS

The FIGURE is a simplified block diagram of the preferred embodiment of the invention.

DETAILED DESCRIPTION OF THE INVENTION

The preferred embodiment of the invention is shown in the FIGURE in which digital motion detector circuit 10 is constructed from EXCLUSIVE OR circuit 12, inverting amplifier 14, shift register 16 and multiple NAND circuit 18. These components are interconnected with and operate upon signals produced by conventional components which are edge detector 20, digital edge memory 22, and clock signal source 24.

In a typical application, edge detector 20 might be a zero crossing detector which produces a signal when the video signal which it receives indicates a change in intensity of illumination, that is, an edge of an object. It should be kept in mind that the video signal is actually a time sequence of electronic signals representing different light intensities at different locations in the camera's field of view, and that the location of each picture element in the field of view has a fixed time relationship with all the other picture elements. Therefore, wherever a picture element is located on the viewing screen, the TV signal will return to that exact location once in every sweep of the screen, and its return each time will be precisely and predictably timed.

The output connection of edge detector 20, on which a digital edge signal is produced each time an edge of an object is sensed, is connected to the input of digital edge memory 22. As with all digital memories, digital edge memory 22 can easily be understood by thinking of the memory as a grid into which signals are placed for later retrieval, with the essential information which is available from the memory being simply whether or not there is a signal in each location in the grid as it is checked, or "addressed".

In that same context, address counter 26, which is connected to and driven by the clock signal from clock signal source 24, can be thought of as the device that sequences the input and output of digital edge memory 22 so that the system knows where information is being placed into or removed from the memory at any time. In effect, address counter 26 sweeps digital memory 22 in the same manner as the TV system sweeps the viewing screen.

Therefore, it is quite apparent that digital edge memory 22 and the TV system can be synchronized together by one skilled in the art, so that the locations in digital edge memory 22 essentially represent regions of the TV screen, either with one location of the memory representing one picture element, or, much to be preferred, one memory location representing many picture elements, in order to reduce the amount of signal processing.

Then, in the preferred embodiment of the invention as shown in the FIGURE, when an edge signal is placed in digital edge memory 22 from the output of edge detector 20, that signal will be available from the output of edge memory 22 at a time that exactly corresponds to the same TV screen location as that of the original signal when it was placed into the memory, except the signals from the memory will be available at the output of memory 22 during a subsequent sweep of the TV screen. In fact, the number of sweeps between the sweep of the TV screen which puts information into the memory and the sweep which retrieves it from memory 22 is controllable and has no bearing on the present invention. The information could be held in the memory until only the next sweep of the screen or until many sweeps later.

The present invention acts upon the signal from the output of memory 22 and upon the most recent edge signal coming directly from edge detector 20 to determine if there has been edge movement, and, if so, to determine if it is sufficient to require activating an alarm signal.

EXCLUSIVE OR circuit 12 has one of its two inputs connected to the output of edge detector 20, and the other input is connected to the output of memory 22, and EXCLUSIVE OR 12 circuit produces an output only if it receives a signal on only one of its inputs. Inverting amplifier 14 is connected to the output of ESCLUSIVE OR circuit 12 and simply inverts the signal from a digital high to a digital low. The presence of inverting amplifier is an option of the circuit designer and the particular circuitry available.

The output of inverting amplifier 14 is connected to, and feeds a signal to the input of shift register 16 only when the signal coming from edge detector 20 and the signal coming from memory 22 differ, that. is, when there has been movement of an edge in the TV signal. Moreover, since the signals being fed to EXCLUSIVE OR 12 are synchronized to clock signal source 24, the signal arriving at shift register 16 from inverting amplifier 14 is also synchronized to the clock.

Clock signal source 24 is also connected to and feeds a clock signal to the clock input of shift register 16, so that shift register 16 can only actually operate on an input signal when that signal is properly timed to the clock signal. In the preferred embodiment, which is used with a conventional TV system, a clock signal of 5 megahertz has been found to operate satisfactorily.

The outputs of shift register 16 are individually connected to the individual inputs of multiple NAND circuit 18 which accumulates the shift register signals and produces an alarm signal output when four signals have accumulated in succession. It should be appreciated that circuit 18 could also be a multiple AND circuit if the polarity of the signals received were opposite of the signals produced in the preferred embodiment shown, and the number of inputs for circuit 18 is actually determined by the number of successive signals which are to be accumulated before an alarm signal is generated.

The circuit of the invention produces a precisely timed and error free alarm signal which also is highly resistant to false indications. Furthermore, since even its output alarm signal is timed to the system clock, it permits subsequent signal processing to also be timed to the system clock, and it therefore permits the following circuits to also avoid noise problems.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. In a TV motion detector circuit of the type which includes an edge detector circuit receiving and processing a TV video signal, with an edge detector circuit output connected to and feeding an output signal to a digital edge memory which stores the edge detector circuit output signal for a selected number of TV sweep cycles before producing an output signal representing the edge detector circuit output signal on digital edge memory output, with the digital edge memory connected to and driven by an address counter, and with the address counter connected to and driven by a clock signal source, the improvement comprising:

an EXCLUSIVE OR circuit with two inputs and an output, with a first input interconnected with the output of the edge detector circuit and the second input interconnected with the output of the digital edge memory;

a shift register with a signal input, a clock input, and at least two outputs, the clock input interconnected with the clock signal source, and the signal input interconnected with the output of the EXCLUSIVE OR circuit; and a multiple input circuit which produces an alarm output signal when all its inputs have the same input signal, with each of its inputs interconnected with an output of the shift register.

2. The TV motion detector circuit of claim 1 further including an inverting amplifier interconnecting the EXCLUSIVE OR circuit output to the shift register signal input.

3. The TV motion detector circuit of claim 1 wherein the multiple input circuit is a NAND circuit.

4. The TV motion detector circuit of claim 1 wherein the multiple input circuit has four inputs, and each of its inputs is connected to a different output of the shift register.

* * * * *